UNITED STATES PATENT OFFICE.

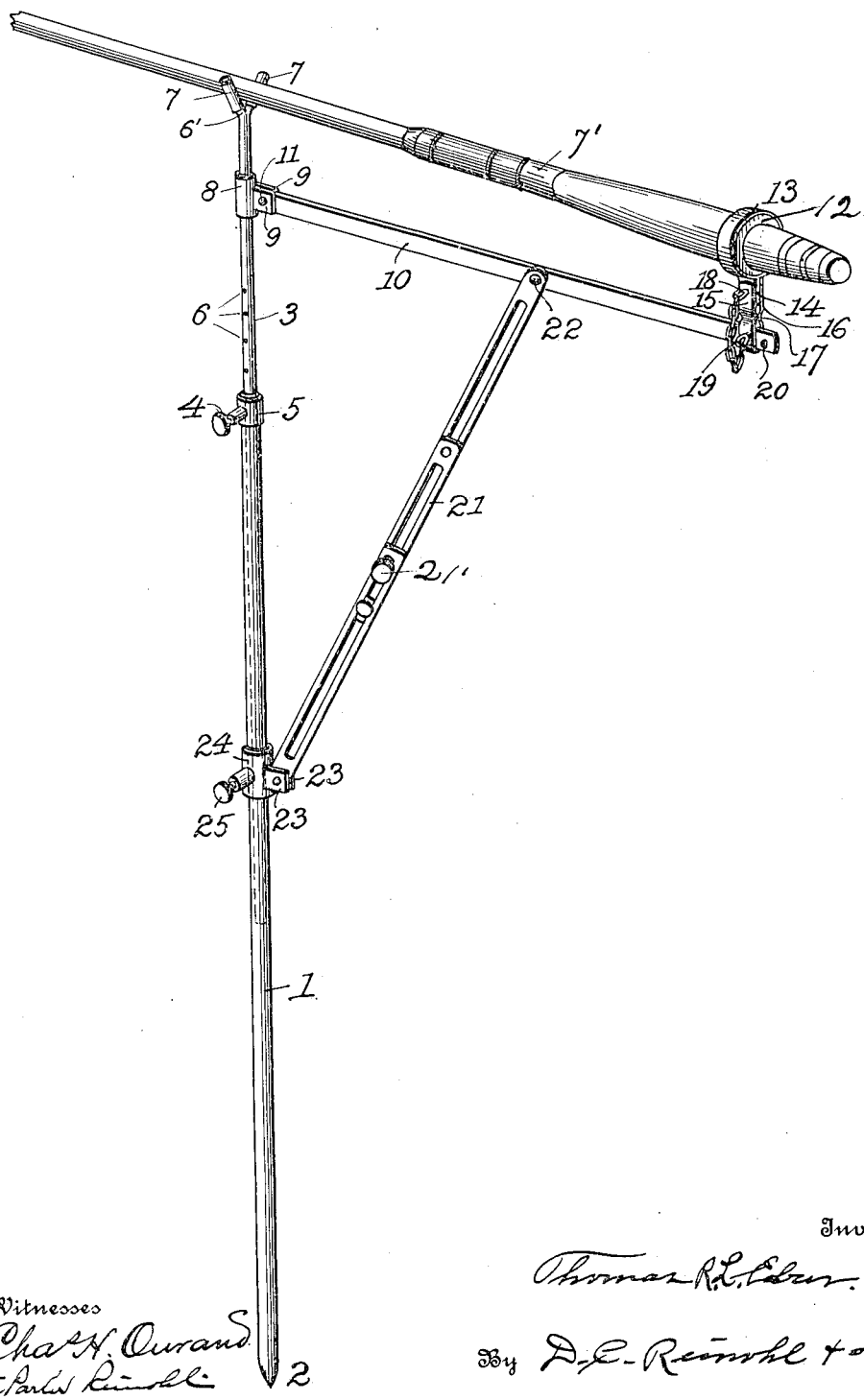

THOMAS R. L. EBUR, OF LEBANON, PENNSYLVANIA.

FISHING-ROD SUPPORT.

1,091,491.  Specification of Letters Patent. Patented Mar. 31, 1914.

Application filed May 6, 1913. Serial No. 765,868.

*To all whom it may concern:*

Be it known that I, THOMAS R. L. EBUR, a citizen of the United States, residing at Lebanon, in the county of Lebanon and State of Pennsylvania, have invented certain new and useful Improvements in Fishing-Rod Supports; and I do hereby declare the following to be a full, clear, and exact description of the invention, such as will enable others skilled in the art to which it appertains to make and use the same.

My invention relates to the piscatorial art, has especial reference to fishing by the use of a rod and line, has for its object means for supporting a fishing rod while the baited line is in the water, and the invention consists in certain features of construction which will be fully disclosed in the following specification and claims.

In the accompanying drawing, which forms part of this specification: the figure illustrates the invention in perspective.

Reference being had to the drawing and the designating characters thereon, the numeral 1 indicates the tubular staff or rod; pointed at its lower end 2 to be readily inserted in the ground.

3 is a vertically extensible member within the rod 1 and adjustably secured in any desired position throughout the range of said member by a thumb screw 4 seated in a collar 5 on the rod 1, with the same extending through the wall of said rod and engaging suitable indentations or seats 6 in the member 3. The member 3 is provided with a supporting fork 6' at its upper end, preferably provided with rubber or like coverings 7 to receive a fishing rod 7' and prevent abrasion.

Secured to the member 3 is a collar 8 having lugs 9, 9, between which one end of an arm 10 is pivotally secured by a pin 11, so that the angle of said arm may be varied to suit the wishes of the user, and on the outer end of said arm is a socket or holder 12, preferably of rubber or other flexible material to receive the butt end of a fishing rod or pole and secure the rod against longitudinal displacement. Said socket 12 is supported in a metallic holder having an eye 13 encircling the socket, and a lug 14, which is pivotally secured between lugs 15, 16 of a member 17 by a cotter pin 18. The member 17 is detachably secured to the arm 10 by a cotter pin 19 and is adjustable thereon through the medium of holes 20, one of which is engaged by the pin 19, as shown. The hinged joint between the lug 14 and the lugs 15, 16 enables the socket to be adjusted to suit different angles of inclinations of the rod by raising or lowering the member 3 in the tubular staff 1.

21 indicates a two part extensible and contractible brace rod secured by a clamping plate and screw 21' one end of which is pivotally secured to the arm 10 at 22 and the opposite end is pivotally secured between lugs 23, 23 on an adjustable sleeve 24 on the staff 1, secured in position by a thumb screw 25. This brace rod by its extensibility and contractibility affords a substantial support to the arm 10 and sustains part of the weight of the fishing rod in whatever position it may be placed.

The device is adapted to be folded and supplies a long felt want of anglers in relieving them of the burden of holding their rods while waiting for results.

Having thus fully described my invention, what I claim is:

1. A device of the class described comprising a staff terminating in a rod support at the upper end thereof, a laterally extending arm, a rod support on the arm, and a brace between and pivotally connected to the staff and said arm.

2. A device of the class described comprising a vertical staff, a vertically extensible member having a rod support at its upper end, a laterally extending arm pivotally joined to said member, a rod support on said arm, and an extensible brace between and pivotally connected to said staff and said arm.

3. A device of the class described comprising a vertical staff, a vertically extensible member terminating in a rod support at its upper end, a laterally extending arm pivotally joined to said member, an annular flexible support on said arm, an extensible brace between and pivotally connected to said staff and said arm.

4. A device of the class described comprising a tubular staff, a member vertically adjustable in said staff and having a rod support at its upper end, a laterally extending arm pivotally joined to said member, a rod support on the free end of the arm, and an extensible brace between and pivotally connected to said staff and said arm.

5. A device of the class described comprising a staff, a vertically extensible member having a rod support at its upper end, a laterally extending arm pivotally joined to said member, a rod support angularly adjustable on said arm, a brace pivotally secured to the arm, and means for adjusting said brace vertically on said staff.

6. A device of the class described comprising a staff, a vertically adjustable member engaging the staff and having a rod support at its upper end, a laterally extending arm pivotally joined to said member, an annular rod support on said arm, and an extensible and contractible brace between the staff and the arm.

7. A foldable device of the class described comprising a hollow staff, a member telescopically supported in said staff, a fishing-rod support on said member, a laterally extending arm pivotally secured to said member, a rod-support movable on said arm, and a brace pivotally connected to said arm and said staff.

In testimony whereof. I affix my signature, in presence of two witnesses.

THOMAS R. L. EBUR.

Witnesses:
D. C. REINOHL,
MARY A. YEAGER.